United States Patent [19]

Yazaki et al.

[11] Patent Number: 4,548,985

[45] Date of Patent: Oct. 22, 1985

[54] HOT-MELT ADHESIVE

[75] Inventors: Jinichi Yazaki, Tokyo; Kozaburo Sakano, Kawasaki; Junichi Matsuo, Yokohama, all of Japan

[73] Assignee: Toyo Seikan Kaisha, Ltd., Tokyo, Japan

[21] Appl. No.: 507,915

[22] Filed: Jun. 27, 1983

[30] Foreign Application Priority Data

Feb. 15, 1983 [JP] Japan .................................. 58-21989

[51] Int. Cl.$^4$ ........................ C08L 51/06; C08L 63/00
[52] U.S. Cl. ........................................ 525/65; 525/64; 525/69
[58] Field of Search .............................. 525/65, 69, 64

[56] References Cited

U.S. PATENT DOCUMENTS 3,222,420 12/1965 Heppolette et al. .................. 525/65
3,760,031 9/1973 Sato et al. ............................. 525/65
4,245,061 1/1981 Tachi et al. ........................... 525/65
4,304,698 12/1981 Tachi et al. ........................... 525/65
4,338,413 7/1982 Coran et al. .......................... 525/65
4,507,411 3/1985 Gordon et al. ....................... 525/65

FOREIGN PATENT DOCUMENTS 57-149370 9/1982 Japan ..................................... 525/65

Primary Examiner—Allan M. Lieberman
Attorney, Agent, or Firm—Sherman & Shalloway

[57] ABSTRACT

Disclosed is a hot-melt adhesive composed of a composition comprising an acid-modified olefin resin formed by graft modification of an ethylenically unsaturated carboxylic acid or its anhydride or a resin composition containing said modified olefin resin and an oxirane ring-containing compound, wherein said composition has a carbonyl group concentration of 1 to 600 millimoles per 100 g of the composition and an oxirane oxygen concentration of 0.01 to 50 millimoles per 100 g of the composition.

8 Claims, No Drawings

HOT-MELT ADHESIVE

BACKGROUND OF THE INVENTION (1) Field of the Invention

The present invention relates to a hot-melt adhesive. More particularly, the present invention relates to a hot-melt adhesive having a novel composition, which is suitable for bonding such resins as olefin resins and olefin-vinyl alcohol copolymers.

(2) Description of the Prior Art

Among various thermoplastic resins, olefin-vinyl alcohol copolymers, especially an ethylene-vinyl alcohol copolymer, is one of resins most excellent in the barrier property (permeation resistance) to various gases such as oxygen and perfume components. This resin is, however, defective in that gas permeability is extremely increased under high humidity conditions, though the resin shows an excellent gas barrier property under low humidity conditions.

In order to moderate this defect, there has widely been adopted a method in which a moisture-resistant thermoplastic resin such as polyolefin is laminated on an olefin-vinyl alcohol copolymer layer and the resulting laminate is used in the form of a cup-shaped, bottle-shaped, tubular or filmy vessel. However, since there is no substantial hot adhesiveness between the olefin-vinyl alcohol copolymer and olefin type resin, lamination and bonding of both the resins are accomplished only by using an adhesive.

This adhesive should have an excellent adhesiveness to both the resins, and lamination and bonding can be accomplished very easily and a laminate should be formed by co-extrusion. In view of these requirements, it is desirable that the adhesive be thermoplastic and capable of hot bonding and hot molding. As the adhesive capable of satisfying these requirements, an adhesive composed of an acid-modified olefin resin formed by graft modification with an ethylenically unsaturated carboxylic acid or its anhydride or a resin composition containing this modified olefin resin has been known and this adhesive alone is used on an industrial scale. In the art, there has been a desire to produce a vessel having a much reduced thickness by draw molding or draw forming a bonded laminated structure. Therefore, development of an adhesive capable of providing a stronger bonding has been desired in the art.

SUMMARY OF THE INVENTION

It is therefore a primary object of the present invention to provide an adhesive which shows a high adhesiveness to an olefin-vinyl alcohol copolymer and other thermoplastic resins such as a polyolefin, a polyester, a polycarbonate or a polyamide, and which can advantageously be applied in hot molding and hot bonding.

More specifically, in accordance with the present invention, there is provided a hot-melt adhesive composed of a composition comprising (A)(i) an acid-modified olefin resin formed by graft modification of an ethylenically unsaturated carboxylic acid or its anhydride or (ii) a resin mixture containing said modified olefin resin and (B) an oxirane ring-containing compound, wherein said composition has a carbonyl group concentration of 1 to 600 millimoles per 100 g of the composition and an oxirane oxygen concentration of 0.01 to 50 millimoles per 100 g of the composition.

DETAILED DESCRIPTION OF THE INVENTION

The present invention is based on the novel finding that if an oxirane ring-containing compound is incorporated in an acid-modified olefin resin formed by graft modification with an ethylenically unsaturated carboxylic acid or its anhydride or a resin composition containing this acid modified olefin resin (referred to as "acid- or acid anhydride-modified olefin resin" hereinafter) so that the concentration of the carbonyl groups

based on the acid or acid anhydride and the concentration of the oxirane oxygen based on the oxirane ring-containing compound are within certain ranges, the adhesive strength is prominently improved over the adhesive strength attained by the single use of the acid- or acid anhydride-modified olefin resin.

It has been known that an acid- or acid anhydride-modified olefin resin (hereinafter referred to as "AMOR") has a good adhesiveness to an olefin resin and an olefin-vinyl alcohol copolymer (hereinafter referred to as "OVAR"), and the portion having the lowest adhesive strength in this bonded structure is the adhesion interface between AMOR and OVAR. For example, the peel strength in the hot adhesion interface between acid-modified polypropylene and OVAR is about 800 g/1.5 cm of the width at highest. When an oxirane ring-containing compound such as epoxidized soybean oil is incorporated in acid-modified polypropylene, the peel strength in the hot adhesion interface to OVAR is increased to a level where peeling is impossible, that is, 3 Kg/1.5 cm of the width or higher, and an unexpected effect of improving the adhesive strength is attained according to the present invention.

This improvement of the adhesive strength can similarly be attained when the adhesive of the present invention is applied to thermoplastic polyesters such as polyethylene terephthalate, polycarbonates and polyamides.

When a composition comprising AMOR and an oxirane ring-containing compound is used for bonding films of resins such as OVAR, in addition to the effect of highly improving the adhesion strength, various advantages can be attained. For example, this composition can be hot-molded as well as ordinary AMOR and hot bonding can easily be accomplished.

The reason why the adhesive strength to films of resins such as an olefin-vinyl alcohol copolymer (OVAR) is highly improved by incorporating an oxirane ring-containing compound in an acid- or acid anhydride-modified olefin resin (AMOR) according to the present invention has not completely been elucidated. However, the following hypothesis is provided.

It is known that when an epoxy resin is cured, it tightly adheres to the surface with which the epoxy resin is contacted. Also in case of the composition of the present invention, it is expected that during the hot bonding, reaction should naturally take place between the acid or acid anhydride group in AMOR and the oxirane ring (epoxy group) in the oxirane ring-containing compound, and it is believed that a strong bonding to resins such as OVAR is formed during this reaction. Furthermore, it is believed that since the oxirane ring-containing compound is interposed between the acid or acid anhydride group in AMOR and the polar group in the resin, for example, the hydroxyl group in OVAR, chemical bonding between both the resin layers is made closer and formed more assuredly.

In addition to formation of this chemical bonding in the interface between both the resin layers, good mingling of both the resins in the interface is believed to be another cause of the improvement of the adhesive strength. More specifically, most of oxirane ring-containing compounds such as epoxidized soybean oil have a plasticizing action, and it is believed that the oxirane ring-containing compound incorporated in AMOR improves the wettability between both the resin layers by its plasticizing action and provides better mingling of both the resins in the adhesion interface. Furthermore, by this plasticizing action, the hot moldability of the adhesive layer, for example, the extrusion property or the adaptability to the coating operation, is prominently improved, and moreover, the adaptability to the hot bonding operation is improved.

It also is known that most of oxirane ring-containing compounds exert a function of imparting a good heat stability to resins when incorporated therein. Although an acid- or acid anhydride-modified olefin resin is relatively poor in the heat stability, by the incorporation of the oxirane ring-containing compound, the stability at the hot molding or hot bonding step is prominently improved.

In the present invention, any of olefin resins graft-modified with ethylenically unsaturated carboxylic acids or anhydrides thereof can be used as the acid- or acid anhydride-modified olefin resin (AMOR). As the acid or acid anhydride, there can be mentioned, for example, acrylic acid, methacrylic acid, crotonic acid, maleic acid, fumaric acid, itaconic acid, citraconic acid, maleic anhydride, itaconic anhydride, citraconic anhydride and tetrahydrophthalic anhydride. Among these compounds, maleic anhydride is especially preferred.

As the olefin resin as the trunk polymer of the graft copolymer, there can be mentioned low density polyethylene, medium density polyethylene, high density polyethylene, isotactic polypropylene, a propylene-ethylene copolymer, a propylene-butene-1 copolymer, a propylene-ethylene-butene-1 copolymer, an ethylene-vinyl acetate copolymer, an ion-crosslinked olefin copolymer (ionomer) and blends of two or more of the foregoing polymers.

In the present invention, an acid- or acid anhydride-modified olefin resin as mentioned above may be used alone as the component (A), or in order to maintain the acid group concentration of the composition within a certain range, at least one acid- or acid anhydride-modified olefin resin may be used in the form of a mixture with at least one unmodified olefin resin or a blend of modified olefin resins differing in the degree of the acid modification may be used.

Any of compounds containing at least one oxirane ring in the molecule can optionally be used as the oxirane ring-containing compound. The oxirane ring-containing compound may be in the form of a liquid, a solid or a semi-solid, so far as it can be blended with the acid- or acid anhydride-modified olefin resin.

As preferred examples of the oxirane ring-containing compound, the following compounds can be mentioned though compounds that can be used in the present invention are not limited to the compounds mentioned below.

(1) Epoxidized glycerides such as epoxidized soybean oil, epoxidized castor oil, epoxidized linseed oil and epoxidized safflower oil.

(2) Epoxidized fatty acid esters such as epoxidized linseed oil fatty acid butyl ester, epoxidized octyl oleate, epoxidized iso-octyl oleate and epoxidized 2-ethylhexyl oleate.

(3) Epoxy hexahydrophthalic acid esters represented by the following formula:

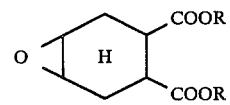

wherein R stands for a higher alkyl group such as a 2-ethylhexyl or isododecyl group.

(4) Other oxirane ring-containing compounds such as 3-(2-xenoxy)-1,2-epoxy-propane, styrene oxide, vinylcyclohexene oxide, glycidyl phthalate, epoxidized polybutadiene, phenyl glycidyl ether, polyethylene glycol bisepoxide, bisphenol A bisepoxide and epoxidized polyethylene wax.

In the present invention, among the above-mentioned oxirane ring-containing compounds, the epoxidized carboxylic acid esters (1) through (3) are especially preferred.

In the adhesive composition of the present invention, it is important that the concentration of the carbonyl group based on the acid- or acid anhydride-modified olefin resin should be 1 to 600 millimoles, especially 5 to 300 millimoles, per 100 g of the composition and the concentration of the oxirane oxygen based on the oxirane ring-containing compound should be 0.01 to 50 millimoles, especially 0.1 to 20 millimoles, per 100 g of the composition.

If the carbonyl group or oxirane oxygen concentration is too low and below the above-mentioned range, the adhesive force to the OVAR layer is much smaller than the adhesive force attained when the carbonyl group or oxirane oxygen concentration is within the range specified in the present invention. When the carbonyl group or oxirane oxygen concentration is too high and exceeds the above range, the hot moldability or hot adhesiveness tends to be reduced and the adhesive layer comes to have an inherent smell or color. In the adhesive composition of the present invention, reaction tends to occur between the oxirane ring and the acid or acid anhydride group at the hot bonding step, and hence, by the above-mentioned carbonyl group or oxirane ring concentration is meant the concentration at the time of blending.

Incorporation of the oxirane ring-containing compound in AMOR can easily be accomplished by dry or wet blending of both the components or by kneading them under heating and, if necessary, pelletizing the kneaded mixture. In order to prevent mutual reactions between the two components as much as possible, it is preferable to adopt a method in which the oxirane ring-containing compound is kneaded with an unmodified olefin resin, the kneaded mixture is pelletized, the resulting pellet is dry-blended with a pellet of AMOR or a pellet of a kneaded mixture of AMOR and an unmodified olefin resin and the dry blend is used for the hot bonding.

The adhesive of the present invention can be used for bonding OVAR and a moisture-resistant thermoplastic resin such as an olefin resin, a polyester or a polycarbonate by interposing a melt of the adhesive between the two resin layers by such means as co-extrusion through a multi-layer multi-ply die. Furthermore, the adhesive of the present invention may be used in the form of a film, a powder, a suspension, an emulsion or a solution for bonding OVAR to other moisture-resistant resin.

Formation of a film of the adhesive of the present invention can be accomplished by a known method such as a method using a T-die. A powder of the adhesive can be formed by pulverizing a pellet of the kneaded adhesive at a low temperature, for example, under cooling with liquefied nitrogen, or by dissolving the adhesive in an organic solvent such as decalin or hot xylene and pouring the solution in a non-solvent to precipitate fine particles.

The adhesive of the present invention is valuably used not only for lamination and bonding of an OVAR layer and a layer of a moisture-resistant resin layer such as a polyolefin, a polyester or a polycarbonate but also for lamination and bonding of other optional resin layers and lamination and bonding of these resin layers to metal foils such as aluminum foils.

The present invention will now be described in detail with reference to the following Examples that by no means limit the scope of the invention.

EXAMPLE 1

Three-resin five-layer laminated sheets having an average thickness of 500μ and comprising inner and outer layers composed of polypropylene, an intermediate layer composed of an ethylene-vinyl alcohol copolymer having a vinyl alcohol content of 70 mole % and adhesive layers composed of a composition comprising maleic anhydride-modified polypropylene having a carbonyl group concentration of 100 millimoles per 100 g of the composition and polypropylene containing therein 5000 ppm of epoxidized soybean oil having an oxirane oxygen content of 6.5% at a mixing ratio shown in Table 1 were formed by using an extruder for inner and outer layers, which was provided with a full-flighted screw having a diameter of 65 mm and an effective length of 1430 mm, an extruder for an intermediate layer, which was provided with a full-flighted screw having a diameter of 50 mm and an effective length of 1100 mm, an extruder for adhesive layers and a 5-ply flat die.

In these sheets, the average thickness of the barrel portion was 500μ and the inner layer/adhesive layer/intermediate layer/adhesive layer/outer layer thickness ratio was 10/1/2/1/10.

TABLE 1

| Adhesive Layer | Amount (parts by weight) of Maleic Anhydride-Modified Polypropylene | Amount (parts by weight) of Epoxy Compound-Containing Polypropylene | Carbonyl Group Concentration (millimoles per 100 g of composition) | Oxirane Oxygen Concentration (millimoles per 100 g of composition) |
|---|---|---|---|---|
| A | 100 | 0 | 100 | 0 |
| B | 90 | 10 | 90 | 0.08 |
| C | 50 | 50 | 50 | 0.39 |
| D | 10 | 90 | 10 | 0.70 |
| E | 0 | 100 | 0 | 0.78 |

With respect to each of the obtained laminated sheets, the adhesive strength (g/15 mm width) between the ethylene-vinyl alcohol copolymer layer and the adhesive layer was measured by a T-peel tester. The obtained results are shown Table 2. Incidentally, peeling in the interface between the polypropylene layer and the adhesive layer was impossible.

TABLE 2

| | Peel Strength (g/15 mm width) | |
|---|---|---|
| Adhesive Layer | after 1 day's storage at normal temperature | after 3 weeks' storage at 30° C. and 80% relative humidity |
| A* | 500 | 250 |
| B | 2500 | 2500 |
| C | peeling was impossible | peeling was impossible |
| D | 1200 | 1200 |
| E* | below 10 | below 10 |

Note
*comparison

EXAMPLE 2

Three-resin five-layer laminated bottles having an average barrel thickness of 400μ and comprising inner and outer layers composed of low density polyethylene having a density of 0.922 g/cm$^3$, an intermediate layer composed of an ethylene-vinyl alcohol copolymer having a vinyl alcohol content of 70 mole % and adhesive layers composed of a composition comprising maleic anhydride-modified polyethylene having a carbonyl group concentration of 12.3 millimoles per 100 g of the composition and low density polyethylene (having a density of 0.922 g/cm$^3$) containing 1000 ppm of epoxidized linseed oil having an oxirane oxygen content of 9% at a mixing ratio shown in Table 3 were formed by using an extruder for the inner and outer layers, which was provided with a full-flighted screw having a diameter of 65 mm and an effective length of 1430 mm, an extruder for the intermediate layer, which was provided with a full-flighted screw having a diameter of 50 mm and an effective length of 1100 mm, an extruder for the adhesive layers and a 5-ply flat die. In the formed bottles, the inner layer/adhesive layer/intermediate layer/adhesive layer/outer layer thickness ratio was 10/1/2/1/10.

TABLE 3

| Adhesive Layer | Amount (parts by weight) of Maleic Anhydride-Modified Polyethylene | Amount (parts by weight) of Epoxy Compound-Containing Polyethylene | Carbonyl Group Concentration (millimoles per 100 g of composition) | Oxirane Oxygen Concentration (millimoles per 100 g of composition) |
|---|---|---|---|---|
| F | 100 | 0 | 12.3 | 0 |

TABLE 3-continued

| Adhesive Layer | Amount (parts by weight) of Maleic Anhydride-Modified Polyethylene | Amount (parts by weight) of Epoxy Compound-Containing Polyethylene | Carbonyl Group Concentration (millimoles per 100 g of composition) | Oxirane Oxygen Concentration (millimoles per 100 g of composition) |
|---|---|---|---|---|
| G | 90 | 10 | 11.1 | 0.02 |
| H | 50 | 50 | 6.2 | 0.11 |
| I | 20 | 80 | 2.5 | 0.17 |
| J | 10 | 90 | 1.2 | 0.19 |
| K | 0 | 100 | 0 | 0.21 |

Test pieces were cut from the barrel portions of the obtained laminated botlles, and the adhesive strength (g/15 mm width) between the ethylene-vinyl alcohol copolymer layer and the adhesive layer was measured by using a T-peel tester. The obtained results are shown in Table 4. Incidentally, peeling in the interface between the polyethylene layer and the adhesive layer was impossible.

TABLE 4

| Adhesive Layer | Peel Strength (g/15 mm width) | |
|---|---|---|
| | after 1 day's storage at normal temperature | after 3 weeks' storage at 30° C. and 80% relative humidity |
| F* | 600 | 250 |
| G | peeling was impossible | peeling was impossible |
| H | peeling was impossible | peeling was impossible |
| I | 1500 | 1400 |
| J | 1200 | 1200 |
| K* | below 10 | below 10 |

Note
*comparison flighted screw having a diameter of 50 mm and an effective length of 1100 mm, an extruder for the adhesive layers and a 5-ply flat die. The inner layer/adhesive layer/intermediate layer/adhesive layer/outer layer thickness ratio was 5/1/2/1/5.

TABLE 5

| Adhesive Layer | Amount (PPM) of Epoxidized Octyl Oleate | Oxirane Oxygen Concentration (millimoles per 100 g of composition) |
|---|---|---|
| L | 0 | 0 |
| M | 1000 | 0.10 |
| N | 5000 | 0.48 |
| O | 20000 | 1.91 |
| P | 50000 | 4.76 |

With respect to each of the obtained laminated sheets, the peel strength (g/15 mm width) was measured in the interface between the ethylene-vinyl alcohol copolymer layer and the adhesive layer and also in the interface between the polyethylene terephthalate layer and the adhesive layer by using a T-peel tester. The obtained results are shown in Table 6.

TABLE 6

| Adhesive Layer | Adhesive Strength (g/15 mm width) | | | |
|---|---|---|---|---|
| | interface between ethylene-vinyl alcohol copolymer layer and adhesive layer | | interface between polyethylene terephthalate layer and adhesive layer | |
| | after 1 day's storage at normal temperature | at 3 weeks' storage at 30° C. and 80% relative humidity | after 1 day's storage at normal temperature | after 3 weeks' storage at 30° C. and 80% relative humidity |
| L* | 700 | 300 | below 10 | below 10 |
| M | 2800 | 2900 | 1500 | 1500 |
| N | peeling was impossible | peeling was impossible | 2500 | 2500 |
| O | peeling was impossible | peeling was impossible | 2800 | 2800 |
| P | peeling was impossible | peeling was impossible | 2700 | 2700 |

Note
*: comparison

EXAMPLE 3

Three-resin five-layer laminated sheets having an average thickness of 300μ and comprising inner and outer layers composed of polyethylene terephthalate, an intermediate layer composed of an ethylene-vinyl alcohol copolymer having a vinyl alcohol content of 70 mole % and adhesive layers composed of a composition comprising maleic anhydride-modified polypropylene having a carbonyl group concentration of 50 millimoles per 100 g of the composition and epoxidized octyl oleate having an oxirane oxygen content of 4% in an amount shown in Table 5 were formed by using an extruder for the inner and outer layers, which was provided with a full-flighted screw having a diameter of 65 mm and an effective length of 1430 mm, an extruder for the intermediate layer, which was provided with a full-

EXAMPLE 4

Three-resin five-layer laminated sheets having an average thickness of 800μ and comprising inner and outer layers composed of an ethylene-propylene copolymer (having an ethylene content of 3% by weight), an intermediate layer composed of an ethylene-vinyl alcohol copolymer (having a vinyl alcohol content of 70 mole %) and adhesive layers composed of a composition comprising maleic anhydride-modified polypropylene having a carbonyl group concentration of 100 millimoles per 100 g of the composition and polypropylene containing 10000 ppm of epoxidized linseed oil having an oxirane oxygen content of 9% at a mixing ratio shown in Table 7 were formed by using an extruder for the inner and outer layers, which was provided with a full-flighted screw having a diameter of 65 mm and an effective length of 1430 mm, an extruder for the intermediate layer, which was provided with a full-flighted screw having a diameter of 50 mm and an effective length of 1100 mm, an extruder for the adhesive layers and a 5-ply flat die. In the obtained laminated sheets, the inner layer/adhesive layer/intermediate layer/adhesive layer/outer layer thickness ratio was 10/1/2/1/10.

TABLE 7

| Adhesive Layer | Amount (parts by weight) of Maleic Anhydride-Modified Polypropylene | Amount (parts by weight) of Epoxy Compound-Containing Polypropylene | Carbonyl Group Concentration (millimoles per 100 g of composition) | Oxirane Oxygen Concentration (millimoles per 100 g of composition) |
|---|---|---|---|---|
| Q | 100 | 0 | 100 | 0 |
| R | 90 | 10 | 90 | 0.21 |
| S | 50 | 50 | 50 | 1.07 |
| T | 10 | 90 | 10 | 1.93 |
| U | 0 | 100 | 0 | 2.14 |

The laminated sheets were heated at the orientation temperature (154° C.) and draw-molded into cup-shaped vessels having an inner capacity of 600 cc by the plug-assist air-pressure forming method.

Test pieces were cut from side wall portions of the obtained cup-shaped vessels, and the adhesive strength (g/15 mm width) between the ethylene-vinyl alcohol copolymer layer and the adhesive layer was measured by using a T-peel tester. The obtained results are shown in Table 8. Incidentally, peeling was impossible in the interface between the ethylene-propylene copolymer layer and the adhesive layer.

TABLE 8

| Adhesive Layer | after 1 day's storage at normal temperature | after 3 weeks' storage at 30° C. and 80% relative humidity |
|---|---|---|
| Q* | 450 | 300 |
| R | peeling was impossible | peeling was impossible |
| S | peeling was impossible | peeling was impossible |
| T | 1800 | 1800 |
| U | below 10 | below 10 |

Note
*comparison

EXAMPLE 5

Pellets of the composition comprising maleic anhydride-modified polypropylene and epoxidized soybean oil-containing polypropylene at a weight ratio of 50/50, which was used in Example 1, were cooled by liquefied nitrogen and shock-pulverized to obtain a powdery adhesive capable of passing through a 325-mesh sieve.

A surface-treated metal foil having a thickness of 20 microns was heated at 220° C. and the powdery adhesive was coated on each surface of the metal foil in an amount of 50 mg/dm² by the fluidized bed coating method in which the metal foil was passed through a fluidized bed of the powdery adhesive.

Two biaxially drawn polyethylene terephthalate films having a thickness of 12 microns were supplied onto the coated metal foil to sandwich the metal foil with the films. The resulting laminate was supplied into a high-frequency induction heating device and was heated under such conditions that the adhesive was melted but the polyester films were not substantially melted, and the laminate was passed through a pair of press rolls to effect hot bonding.

When the obtained laminate was subjected to the T-peel strength test, peeling was impossible. When the laminate was subjected to the retort sterilization at 120° C. for 30 minutes and was then subjected to the T-peel strength test, peeling was impossible.

Accordingly, it was confirmed that the above-mentioned laminate was valuable as a material for a retortable pouch.

EXAMPLE 6

A four-resin five-layer bottle having an average barrel thickness of 500μ and comprising an inner layer composed of polypropylene, an outer layer composed of a polycarbonate (poly-4,4'-dihydroxydiphenyl-2,2-propane-carbonate), an intermediate layer composed of an ethylene-vinyl alcohol copolymer (having a vinyl alcohol content of 70 mole %) and adhesive layers composed of a composition comprising maleic anhydride-modified polypropylene having a carbonyl group concentration of 100 millimoles per 100 g of the composition and polypropylene containing 2% by weight of epoxidized octyl oleate having an oxirane oxygen content of 4% at a mixing ratio of 1/1 (the carbonyl group concentration was 50 millimoles per 100 g of the composition and the oxirane oxygen concentration was 0.95 millimole per 100 g of the composition) was formed by using an extruder for the inner layer, which was provided with a full-flighted screw having a diameter of 65 mm and an effective length of 1430 mm, an extruder for the outer layer, which was provided with a full-flighted screw having a diameter of 65 mm and an effective length of 1430 mm, an extruder for the intermediate layer, which was provided with a full-flighted screw having a diameter of 50 mm and an effective length of 1100 mm, an extruder for the adhesive layers and a 5-ply die. The inner layer/adhesive layer/intermediate layer/adhesive layer/outer layer thickness ratio was 30/1/2/1/10.

A test piece was cut from the barrel wall of the bottle and subjected to the T-peel strength test. It was found that the peel strength was 1500 g/15 mm width in the interface between the polycarbonate layer and the adhesive layer and that peeling was impossible in the interface between the ethylene-vinyl alcohol copolymer layer and the adhesive layer and in the interface between polypropylene layer and the adhesive layer.

For comparison, a four-resin five-layer bottle was prepared in the same manner as described above except that maleic anhydride-modified polypropylene having a carbonyl group concentration of 50 millimoles per 100 g of the resin was used for the adhesive layers. The peel strength in the interface between the polycarbonate layer and the adhesive layer was lower than 10 g/10 mm width.

What is claimed is:

1. A hot-melt adhesive composition comprising
   (A)(i) an acid-modified olefin resin formed by graft modification with an ethylenically unsaturated carboxylic acid or its anhydride or (ii) a resin mixture of said acid-modified olefin resin with an olefin resin and (B) an oxirane ring-containing compound selected from the group consisting of epoxidized glycerides, epoxidized fatty acid esters and epoxy hexahydrophthalic acid esters, said composition having a carbonyl group concentration of 1 to 600 millimoles per 100 g of the composition and an oxirane oxygen concentration of 0.01 to 50 millimoles per 100 g of the composition.

2. A hot-melt adhesive as set forth in claim 1, wherein the modified olefin resin is an olefin resin modified with acrylic acid, methacrylic acid, crotonic acid, maleic acid, fumaric acid, itaconic acid, citraconic acid, maleic anhydride, itaconic anhydride, citraconic anhydride or tetrahydrophthalic anhydride.

3. A hot-melt adhesive as set forth in claim 1, wherein the modified olefin resin is an olefin resin modified with maleic anhydride.

4. A hot-melt adhesive as set forth in claim 1, wherein the trunk polymer of the modified olefin resin is at least one member selected from the group consisting of low density polyethylene, medium density polyethylene, high density polyethylene, isotactic polypropylene, a propylene-ethylene copolymer, a propylene-butene-1 copolymer, a propylene-ethylene-butene-1 copolymer, an ethylene-vinyl acetate copolymer and an ion-cross-linked olefin copolymer.

5. A hot-melt adhesive as set forth in claim 1, which comprises at least one unmodified olefin resin.

6. A hot-melt adhesive as set forth in claim 1, wherein the oxirane ring-containing compound is a member selected from the group consisting of epoxidized soybean oil, epoxidized castor oil, epoxidized linseed oil, epoxidized safflower oil, epoxidized linseed oil fatty acid butyl ester, epoxidized octyl oleate, epoxidized iso-octyl oleate, epoxidized 2-ethylhexyl oleate and epoxy hexahydrophthalic acid esters represented by the following formula:

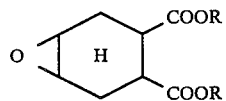

wherein R stands for a higher alkyl group such as a 2-ethylhexyl or isododecyl group.

7. A hot-melt adhesive as set forth in claim 1, wherein the carbonyl group concentration is 5 to 300 millimoles per 100 g of the composition and the oxirane oxygen concentration is 0.1 to 20 millimoles per 100 g of the composition.

8. A hot-melt adhesive as set forth in claim 1, which is in the form of a film or powder.

* * * * *